US008836227B2

(12) United States Patent
Umezawa et al.

(10) Patent No.: US 8,836,227 B2
(45) Date of Patent: Sep. 16, 2014

(54) LIGHTING DEVICE

(75) Inventors: Yoshihisa Umezawa, Konosu (JP); Kensuke Kaneko, Konosu (JP)

(73) Assignee: Eye Lighting Systems Corporation, Chuo-ku, Tokyo (JP)

( * ) Notice: Subject to any disclaimer, the term of this patent is extended or adjusted under 35 U.S.C. 154(b) by 140 days.

(21) Appl. No.: 13/592,375

(22) Filed: Aug. 23, 2012

(65) Prior Publication Data

US 2013/0049624 A1    Feb. 28, 2013

(30) Foreign Application Priority Data

Aug. 25, 2011 (JP) .................................. 2011-183369

(51) Int. Cl.
  *H05B 37/02* (2006.01)
  *H05B 41/28* (2006.01)
  *H05B 41/285* (2006.01)
(52) U.S. Cl.
  CPC ............ *H05B 41/28* (2013.01); *H05B 41/2853* (2013.01); *Y02B 20/186* (2013.01)
  USPC .................... 315/209 R; 315/224; 315/308
(58) Field of Classification Search
  USPC ............. 315/209 R–211, 224–226, 291, 307, 315/308, 312, 318
  See application file for complete search history.

(56) References Cited

U.S. PATENT DOCUMENTS 8,115,405 B2 *    2/2012   Yamahara et al. ............ 315/276

FOREIGN PATENT DOCUMENTS

JP      09-055296       2/1997

OTHER PUBLICATIONS

Patent Abstracts of Japan, 09-055296, ten pages, (Feb. 25, 1997).

* cited by examiner

*Primary Examiner* — Jimmy Vu
(74) *Attorney, Agent, or Firm* — Rankin, Hill & Clark LLP (57) ABSTRACT

A lighting device has a power-factor correction circuit 6, a step-down chopper circuit 8, a full-bridge circuit 10, control ICs for these circuits and a driving-voltage supply circuit 14. The supply circuit 14 supplies a driving voltage to the control ICs. The control IC outputs the on/off driving voltage to a switching element of the corresponding circuit 6 to 10. The lighting device also has a detector 16 and judgment equipment 18. The detector 16 detects the driving voltage supplied from the supply circuit 14. The judgment equipment 18 instructs the control ICs to start outputting the on/off driving voltages in the order from the control IC close to the power source 2 to the control IC close to the discharge lamp 4 when the driving voltage detected by the detector 16 reaches a predetermined value during the time when the driving voltage supplied from the supply circuit 14 rises.

12 Claims, 6 Drawing Sheets

PRIOR ART

FIG. 6

PRIOR ART

LIGHTING DEVICE

CROSS-REFERENCE TO RELATED APPLICATIONS

This application is based on and claims the benefits of priority from Japanese Patent Application No. 2011-183369, filed on Aug. 25, 2011, the entire contents of which are incorporated herein by reference.

BACKGROUND OF THE INVENTION

1. Field of the Invention

The present invention relates to lighting devices such as a discharge-lamp lighting device and an LED lighting device, and more particularly, to start and stop control of a control IC, a driver, or another driving circuit for driving a switching element used in a lighting device.

2. Description of the Related Art

Since inverters can easily output a high frequency rectangular signal, they are used in lighting devices for high intensity discharge (HID) lamps. They are also used in direct-current power supply circuits that light LED light sources. In inverters, many switching elements such as power MOS FETs, which can be driven at high frequency, are used, and special analog control ICs are used in many cases to drive these switching elements. In recent years, control ICs for switching elements have become available in the market at inexpensive prices and many of them are highly functional. Therefore, when a lighting device includes a plurality of switching elements, they are operated in units of circuit blocks each including one or a plurality of switching elements and a special control IC therefor. A standard control voltage of about 15 V is supplied to each control IC from a control power supply circuit provided for the lighting device. Power is supplied to the control power supply circuit from the lighting device. For example, a part of the power input to the lighting device, or a part of the direct-current power converted by the lighting device, is used (see FIG. 1 of Japanese Unexamined Patent Application Publication No. Hei-9-55296).

When the plurality of control ICs operate with the common control voltage, they may be activated not in a desired order but in a random order, or they may operate in an unstable manner even if they are activated, causing circuit failure. This is because the operating voltages, especially the minimum operating voltages, of the special control ICs provided for the circuit blocks are different from each other. When the power to the lighting device is turned on, first the control power supply circuit starts up, and the control voltage supplied from the control power supply circuit rises to reach the standard voltage, 15 V, in the start-up process. In this rise time, control ICs in which the control voltages reach the minimum operating voltages earlier are activated earlier. However, since the control ICs are designed according to the functions and characteristics of the corresponding circuit blocks, it is very difficult to make the minimum operating voltages of the control ICs equal. Therefore, it is demanded that, even when many control ICs having different minimum operating voltages are used, they be activated in a desired order.

When the control ICs are stopped when the power supplied to the lighting device is interrupted, the control ICs may stop not in a desired order but in a random order. This is also because the minimum operating voltages of the control ICs are different from each other. In the fall time of the control voltage, control ICs in which the control voltages reach the minimum operating voltages earlier stop operating earlier. In addition, some control ICs continue to output a voltage in malfunction even if the control voltage becomes lower than the minimum operating voltages. This unstable operation of the control ICs and the random-order stopping of the control ICs are considered as causes of circuit failure.

Even when the power is supplied to the control power supply circuit from a special battery, the same events can occur upon turning on the power or at power interruption. In addition, the same events can also occur if the voltage drops due to fluctuation of the external power source or if the remaining battery capacity is low.

Figure 5:
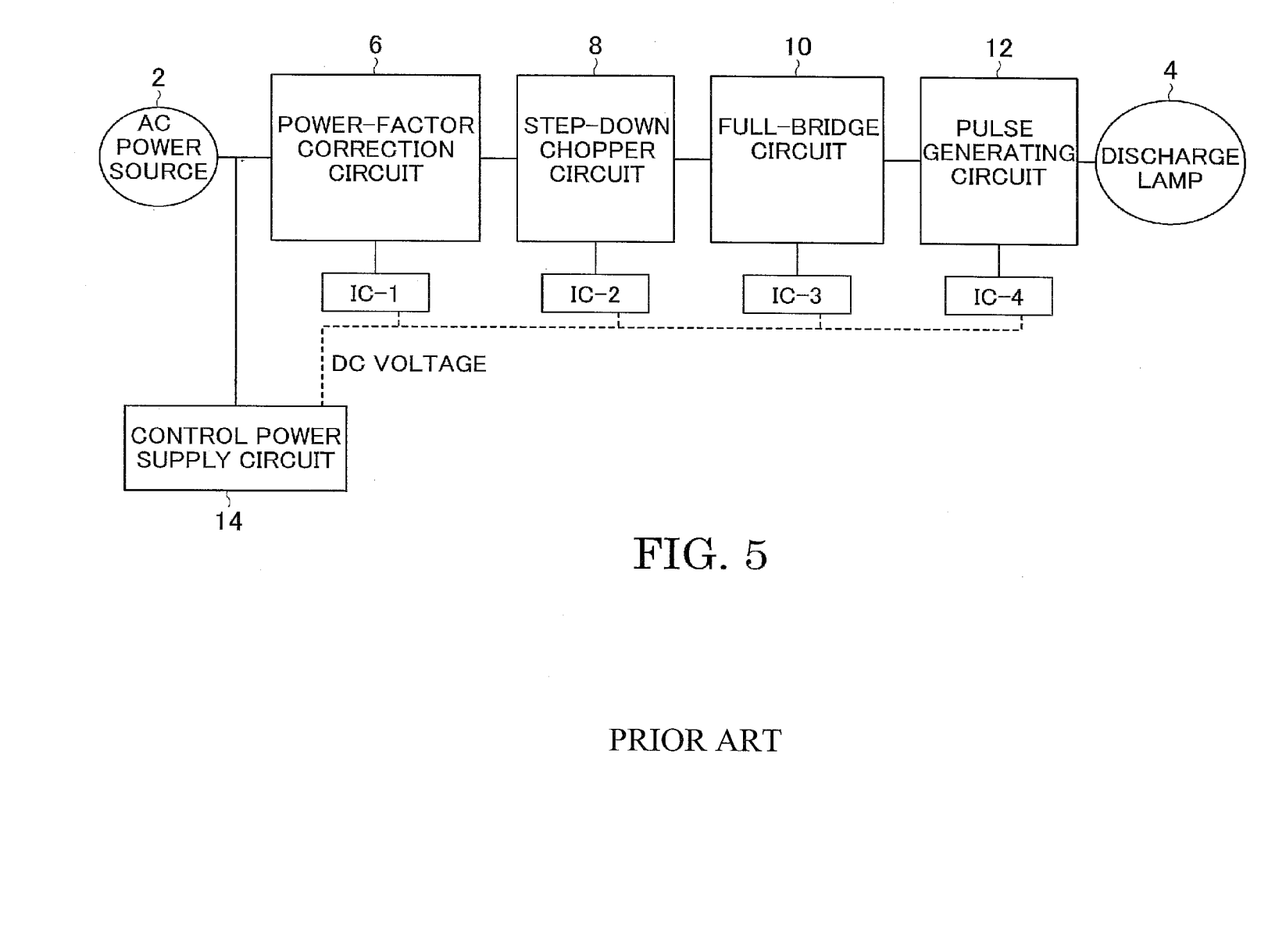
FIG. 5 is a view showing the entire configuration of a conventional discharge-lamp lighting device.

FIG. 5 shows the entire configuration of a discharge-lamp lighting device that uses a general inverter. This discharge-lamp lighting device converts the power input from an alternating-current power source 2 to a desired output power and supplies the output power to a discharge lamp 4. As shown in FIG. 5, the lighting device includes a power-factor correction circuit 6, a step-down chopper circuit 8, a full-bridge circuit 10, and a pulse generating circuit 12. The power-factor correction circuit 6 smoothes the input power and corrects the waveform distortion of the input current to remove harmonic current, and includes a high-frequency switching element for removing harmonic current. The step-down chopper circuit 8 makes the output of the power-factor correction circuit 6 constant and includes a special high-frequency switching element. The full-bridge circuit 10 converts the output of the step-down chopper circuit 8 to a rectangular voltage and adjusts the alternating frequency thereof, and is formed of four switching elements connected in a full bridge. The pulse generating circuit 12 generates high-voltage pulses at the start-up, superposes the high-voltage pulses on the rectangular voltage output from the full-bridge circuit 10, and applies the resultant voltage to the discharge lamp 4.

The circuits are respectively provided with control ICs (IC-1 to IC-4) for driving the switching element or elements of the circuits. A control power supply circuit 14 is also provided to supply a control voltage to these control ICs. In the following description, the power-factor correction circuit 6, the step-down chopper circuit 8, the full-bridge circuit 10, and the pulse generating circuit 12, all of which include a switching element or elements, are simply called switching circuits in some cases.

Figure 6:
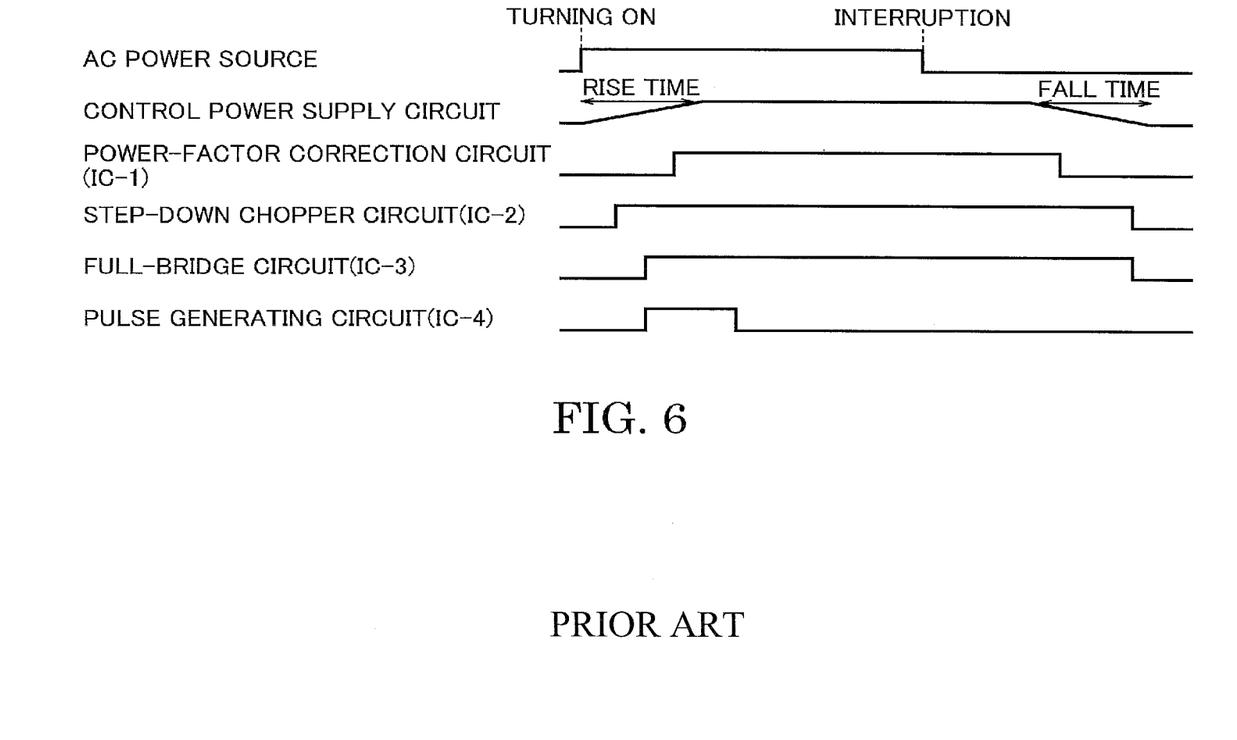
FIG. 6 is a timing chart showing the operation of control ICs in the conventional discharge-lamp lighting device.

FIG. 6 is a timing chart showing starting and stopping of the control ICs when the power from the alternating-current power source 2 to the conventional discharge-lamp lighting device configured as described above is turned on or interrupted. As shown in FIG. 6, almost at the same time as when the alternating-current power source 2 is turned on, the output (the control voltage) of the control power supply circuit 14 starts to rise and reaches the standard value within a predetermined rise time. When the alternating-current power source 2 is interrupted, the control voltage starts to fall after a predetermined time elapses. This is because electric charge accumulated in capacitors and other components of the control power supply circuit 14 is discharged when the power source 2 is interrupted, and the supply of the control voltage is maintained for the predetermined time. Therefore, as shown in FIG. 6, the operation of the control power supply circuit 14 includes the rise time and the fall time.

In the conventional lighting device, when the control voltage supplied to the control ICs reaches the minimum operating voltages, the control ICs start to operate. In the rise time of the control voltage, the control IC (IC-2) for the step-down chopper circuit 8, which has a low minimum operating voltage, starts operating first. Then, the control IC (IC-3) for the full-bridge circuit 10 and the control IC (IC-4) for the pulse generating circuit 12, which have intermediate minimum operating voltages, start operating almost simultaneously.

The control IC (IC-1) for the power-factor correction circuit 6, which has a high minimum operating voltage, starts operating last. The control IC (IC-4) for the pulse generating circuit 12 automatically stops operating because it does not need to operate after the discharge lamp starts up.

The power-factor correction circuit 6, the step-down chopper circuit 8, and the full-bridge circuit 10 continuously operate while the discharge lamp 4 is on. Therefore, the circuits keep operating at least until the power from the alternating-current power source 2 to the lighting device is interrupted. Even after the power from the alternating-current power source 2 is interrupted, the circuits keep operating while the control voltage is maintained. When the control power supply circuit 14 enters the fall time, the control voltage gradually decreases. Therefore, the control IC (IC-1) for the power-factor correction circuit 6, which has a high minimum operating voltage, stops operating first. Since the control IC (IC-3) for the full-bridge circuit 10 has an intermediate minimum operating voltage, it should stop earlier than the control IC (IC-2). However, as shown in FIG. 6, due to malfunction of the control IC (IC-3), the control IC (IC-3) for the full-bridge circuit 10 and the control IC (IC-2) for the step-down chopper circuit 8, which has a low minimum operating voltage, stop operating almost simultaneously. Although the control voltage is lower than the intermediate minimum operating voltage, the control IC (IC-3) for the full-bridge circuit 10 continues to output a voltage and stops almost at the same time as the control IC (IC-2) for the step-down chopper circuit 8.

From the viewpoint of circuit protection, it is desired in the discharge-lamp lighting device of FIG. 5 that the circuits start operating in the order shown, from the alternating-current power source 2 to the discharge lamp 4, and stop operating in the order shown, from the discharge lamp 4 to the alternating-current power source 2. During the rise time and fall time of the control voltage, however, each of the control ICs starts and stops operating at its minimum operating voltage. In addition, some control ICs may operate even at a voltage lower than their minimum operating voltages. Therefore, as described above, the control ICs may start and stop operating in a random order or the control ICs may operate in an unstable manner.

In the above description, the control ICs drive the switching circuits. The same problems occur also when drivers are used to drive the switching circuits.

SUMMARY OF THE INVENTION

The present invention has been made in view of the foregoing problems, where, when a lighting device has a plurality of switching circuits, a driving circuit is provided for each of the switching circuits to drive it, and the driving circuits have different operating voltages from each other; the driving circuits may start and stop operating in a random order or the driving circuits may operate in unstable manner. An object of the present invention is to provide a lighting device capable of starting or stopping driving circuits for switching elements in a desired order and of operating the driving circuits in a stable manner.

To solve the problems described above, detecting means for detecting a driving voltage supplied to driving circuits (such as control ICs or drivers) is provided, and judging means for instructing starting and stopping of supplying the driving voltage to switching elements according to the detected value of the detecting means is also provided. When the power to the lighting device is turned on, after it is confirmed that the driving voltage to the driving circuits rises to a predetermined value to provide a stable power source, the supply of the driving voltages to the switching elements is started in a predetermined order. When the power to the lighting device is interrupted, the supply of the driving voltages to all of the switching elements is stopped in a predetermined order before the driving voltage to the driving circuits starts to fall.

A lighting device according to the present invention is provided with a plurality of switching circuits. Among them, a switching circuit disposed close to an external power source is called a first switching circuit, and a switching circuit disposed close to a light source is called a second switching circuit. The lighting device is also provided with first and second driving circuits and a driving-voltage supply circuit. The first switching circuit uses the power input from the external power source to generate predetermined output power when one or more switching elements are driven. The first driving circuit outputs a on and off driving voltage to the switching elements of the first switching circuit. The second switching circuit uses the output power of the first switching circuit to generate predetermined output power when one or more switching elements are driven. The second driving circuit outputs a on and off driving voltage to the switching elements of the second switching circuit. The driving-voltage supply circuit supplies a driving voltage to the driving circuits. The lighting device of the present invention lights the light source with the output power of the second switching circuit.

The lighting device is further provided with detection means and judging means. The detection means detects the driving voltage supplied from the driving-voltage supply circuit. The judging means instructs the driving circuits to start outputting the on and off driving voltages in the order from the driving circuit close to the external power source to the driving circuit close to the light source when the driving voltage detected by the detection means reaches a predetermined value during the time when the driving voltage supplied from the driving-voltage supply circuit rises.

The judging means may instruct the driving circuits to stop outputting the on and off driving voltages in the order from the driving circuit close to the light source to the driving circuit close to the external power source before the driving voltage detected by the detection means becomes lower than the predetermined value during the time when the driving voltage supplied from the driving-voltage supply circuit falls. The lighting device may include three or more switching circuits that include the first and second switching circuits, and three or more driving circuits that include the first and second driving circuits, and the judging means may instruct in a predetermined order the driving circuits to perform the output operation.

The driving circuits may be control ICs. The control ICs determine the on and off timing of the switching elements according to the detected values of controlled quantities of the switching circuits and output the driving voltages at the on and off timing. The driving circuits may be drivers. The drivers output the driving voltages at the on and off timing determined by input signals of the on and off timing.

As described above, according to the present invention, since the detection means and judging means are provided, the driving circuits, such as control ICs or drivers, can be activated in a desired order after a stable driving voltage equal to or larger than the predetermined value is obtained when the driving voltage for the driving circuits rises upon turning on the power or in other situations. In addition, all of the driving circuits can be stopped in a desired order within a period during which the driving voltage is maintained at the predetermined value or more when the driving voltage for the driving circuits falls when the power is interrupted or in other situations. Therefore, the driving circuits are prevented from being activated or stopped in a random order. Since the driving circuits are reliably activated and stopped in a condition where stable operating voltages are obtained, the driving circuits are prevented from malfunctioning. Unstable operation of the driving circuits caused by insufficient driving voltages is eliminated, and circuit failure does not easily occur. A highly reliable lighting device can be provided.

The present invention is effective not only when turning on and interrupting the external power source but also when the external power source fluctuates or when the remaining battery capacity decreases during the time when the light source is on. For example, when the driving voltage for the driving circuits becomes lower than the predetermined value due to fluctuation of the external power source, the driving circuits can be stopped reliably in the same way as when the power source is interrupted. When the driving voltage is restored to the predetermined value or more, the driving circuits can be activated reliably in the same way as when the power source is turned on. Therefore, even if the external power source fluctuates, starting and stopping of the driving circuits can be appropriately controlled. The driving circuits are prevented from being activated or stopped in a random manner, and are also prevented from malfunctioning.

DESCRIPTION OF THE PREFERRED EMBODIMENTS

Figure 1:
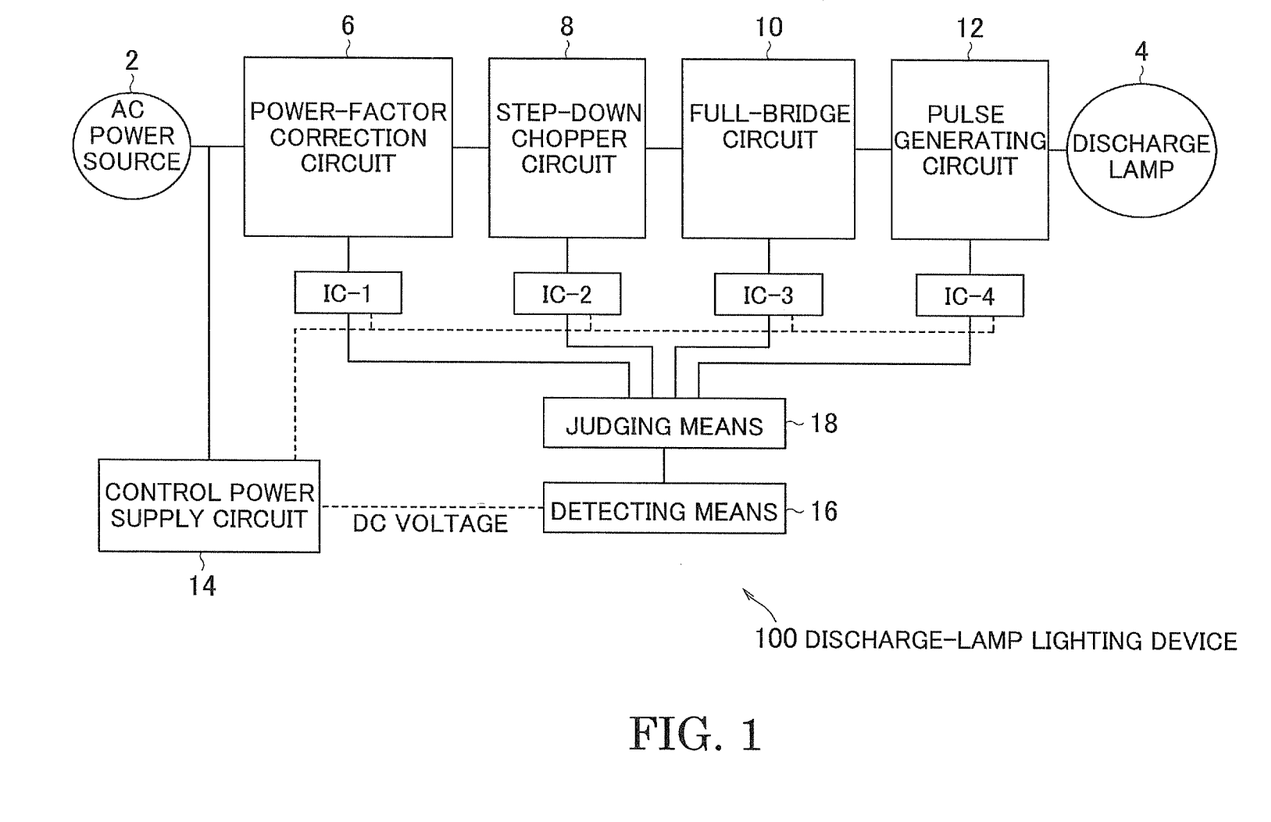
FIG. 1 is a view showing the entire configuration of a discharge-lamp lighting device of the present invention.

FIG. 1 is a view showing the entire configuration of a discharge-lamp lighting device 100 of the present invention. As shown in the figure, in the same way as the conventional discharge-lamp lighting device shown in FIG. 5, the discharge-lamp lighting device 100 also includes a power-factor correction circuit 6, a step-down chopper circuit 8, a full-bridge circuit 10, and a pulse generating circuit 12. A description will be omitted for components common to those shown in FIG. 5. The configuration shown in FIG. 1 is just an example configuration of a lighting device of the present invention. The present invention also encompasses lighting devices having different configurations. For example, the present invention encompasses a discharge-lamp lighting device that uses a full-bridge step-down chopper circuit or a half-bridge step-down chopper circuit, both of which have the function of a step-down chopper circuit and the function of a full-bridge circuit. The present invention also includes lighting devices for light sources other than discharge lamps. For example, the present invention includes an LED lighting device that supplies a predetermined direct current to an LED with a combination of a power-factor correction circuit and a step-down chopper circuit. In other words, lighting devices according to the present invention combine at least two switching circuits to generate the power required for a light source from external power.

The configurations of detection means 16 and judging means 18, which are features of the discharge-lamp lighting device 100, will be described below. Specifically, the detection means 16 and the judging means 18 are each formed of a microcomputer.

The detection means 16 detects a DC voltage (control voltage) generated by a control power supply circuit 14 and gives the detected value to the judging means 18. The control power supply circuit 14 serves as a driving-voltage supply circuit of the present invention.

The judging means 18 separately sends control commands based on the detected value of the DC voltage to control ICs for the switching circuits 6, 8, 10, and 12. The judging means 18 compares the detected value of the DC voltage with a predetermined value; when the detected value is equal to or larger than the predetermined value, the judging means 18 sends commands for supplying driving voltages to switching elements; and when the detected value is smaller than the predetermined value, the judging means 18 sends commands for stopping the supply of the driving voltages to the switching elements. When the control ICs receive control commands from the judging means 18, the control ICs supply the driving voltages to the corresponding switching elements or stop supplying the driving voltages. For example, a special switch may be provided for each of the control ICs in a DC voltage supply line thereto (indicated by dashed lines in FIG. 1). In that case, when the switch is turned on with a supply command sent from the judging means 18, the DC voltage is applied to the corresponding control IC, and the control IC starts supplying the driving voltage to the switching element. Alternatively, a switching part may be provided at the output side of each of the control ICs. In that case, the control IC applies the driving voltage to the switching element while the control IC is receiving a supply command from the judging means 18; and the control IC does not apply the driving voltage to the switching element while the control IC is receiving a stop command from the judging means 18.

Figure 2:
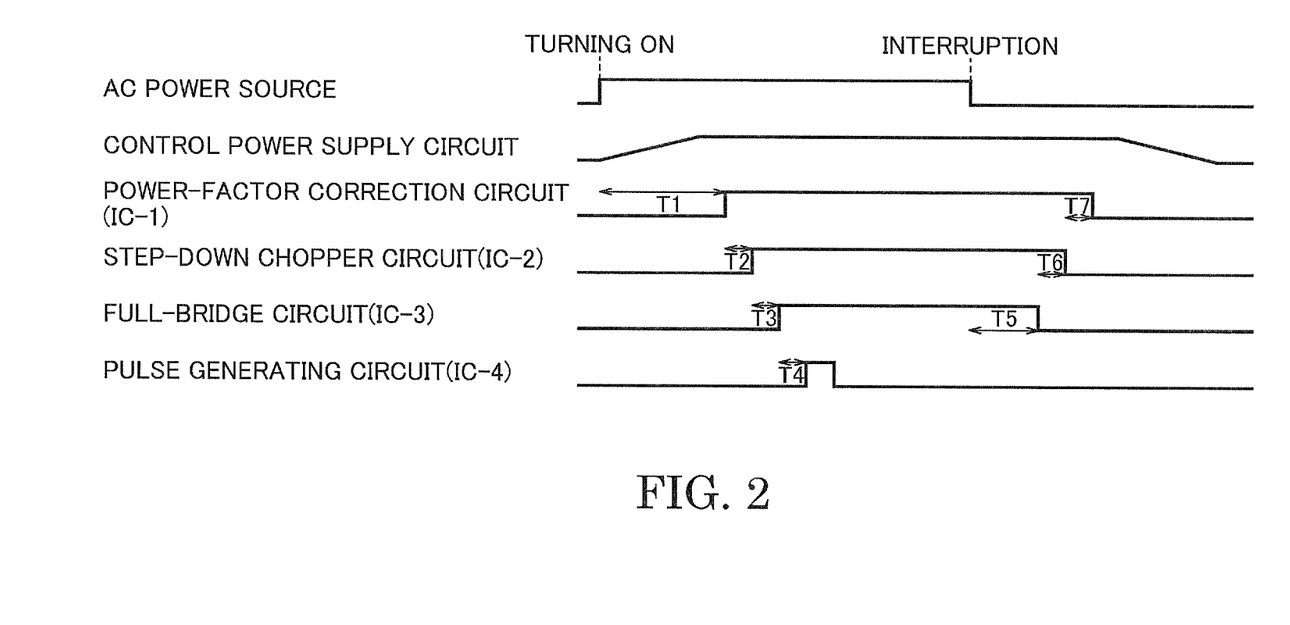
FIG. 2 is a timing chart showing the operation of control ICs in the discharge-lamp lighting device.

The judging means 18 can send control commands for allowing the outputs of the driving voltages, to the control ICs IC-1 to IC-4 in a predetermined order. The operation of the control ICs will be described below with reference to a timing chart shown in FIG. 2. As shown in FIG. 2, the DC voltage output from the control power supply circuit 14 increases almost at the same time as when an alternating-current power source 2 is turned on, and reaches a predetermined value within a predetermined rise time. The predetermined value may be a level where the DC voltage becomes constant in FIG. 2, or may be 80% to 100% of that level.

When the detected value of the DC voltage reaches the predetermined value, the judging means 18 first sends a control command to the control IC IC-1, which starts the operation of the power-factor correction circuit 6. The period of time from when the alternating-current power source 2 is turned on to when the power-factor correction circuit 6 starts operating is called T1. Then, when a predetermined period of time (T2) elapses after the power-factor correction circuit 6 starts operating, the judging means 18 sends a control command to the control IC IC-2, which starts the operation of the step-down chopper circuit 8. When a predetermined period of time (T3) elapses after the step-down chopper circuit 8 starts operating, the judging means 18 sends a control command to the control IC IC-3, which starts the operation of the full-bridge circuit 10. Last, when a predetermined period of time (T4) elapses after the full-bridge circuit 10 starts operating, the judging means 18 sends a control command to the control IC IC-4, which starts the operation of the pulse generating circuit 12. The judging means 18 sends a permission command to the control IC IC-4 until start-up of the discharge lamp is confirmed, and then, the transmission of the permission command automatically stops.

The period of time T1 from when the alternating-current power source 2 is turned on to when the power-factor correction circuit 6 starts operating may be measured during initial adjustment, and a control command may be sent to the control IC IC-1 after the period of time T1 elapses from when the alternating-current power source 2 is turned on, in the same way as for the other periods of time T2 to T4. In that case, power-source-voltage detection means (not shown) for detecting turning on or interruption of the alternating-current power source 2 may be provided, so that the judging means 18 measures the period of time T1 from when the power-source-voltage detection means detects turning on of the alternating-current power source 2 and starts the operation of the power-factor correction circuit 6.

When the alternating-current power source 2 is interrupted, the following operation is performed while the control voltage is maintained after the interruption. The judging means 18 first sends a stop command to the control IC IC-3, which stops the supply of the driving voltage from the control IC IC-3 to the switching element. The full-bridge circuit 10 stops operating. The period of time from when the alternating-current power source 2 is interrupted to when the full-bridge circuit 10 stops operating is called T5. The judging means 18 may measure the period of time T5 from when the power-source-voltage detection means detects the interruption of the alternating-current power source 2 and stop the operation of the full-bridge circuit 10. The judging means 18 sends a stop command to the control IC IC-2 when a predetermined period of time (T6) elapses after the full-bridge circuit 10 stops operating, to stop the operation of the step-down circuit 8. The judging means 18 sends a stop command to the control IC IC-1 when a predetermined period of time (T7) elapses after the step-down chopper circuit 8 stops operating, to stop the operation of the power-factor correction circuit 6. The control voltage starts to fall after the power-factor correction circuit 6 stops operating.

The detected value of the control voltage is obtained by using the detection means 16, and the period of time from when the interruption of the alternating-current power source 2 to when the control voltage starts to fall is measured in advance. The periods of time T5 to T7 are set with sufficient margins such that all the control ICs are stopped until the control voltage starts to fall.

As described above, the discharge-lamp lighting device 100 of the present invention is capable of activating the circuits 6, 8, 10, and 12 sequentially from the alternating-current power source 2 to the discharge lamp 4 and is also capable of stopping the circuits 10, 8 and 6 sequentially from the discharge lamp 4 to the alternating-current power source 2, from the viewpoint of circuit protection. More specifically, by providing the detection means 16 and the judging means 18, when the control voltage rises upon turning on the power source and in other situations, the control ICs IC-1 to IC-4 can be activated in a desirable order after a stable control voltage equal to or larger than the predetermined value is obtained. In addition, when the control voltage falls when the power source is interrupted and in other situations, the control ICs IC-1 to IC-3 can be stopped in a desirable order during the time when the control voltage is maintained at the predetermined value or more. Therefore, the control ICs IC-1 to IC-4 are prevented from starting or stopping operating in a random order. Since the control ICs are activated or stopped reliably with the supply of a stable control voltage, the control ICs are prevented from malfunctioning and operate in a stable manner. The control ICs are prevented from operating in an unstable manner because of a low control voltage, and circuit failure does not easily occur, providing a highly reliable lighting device.

The driving circuits of the present invention may be drivers instead of the control ICs, described above.

Figure 3:
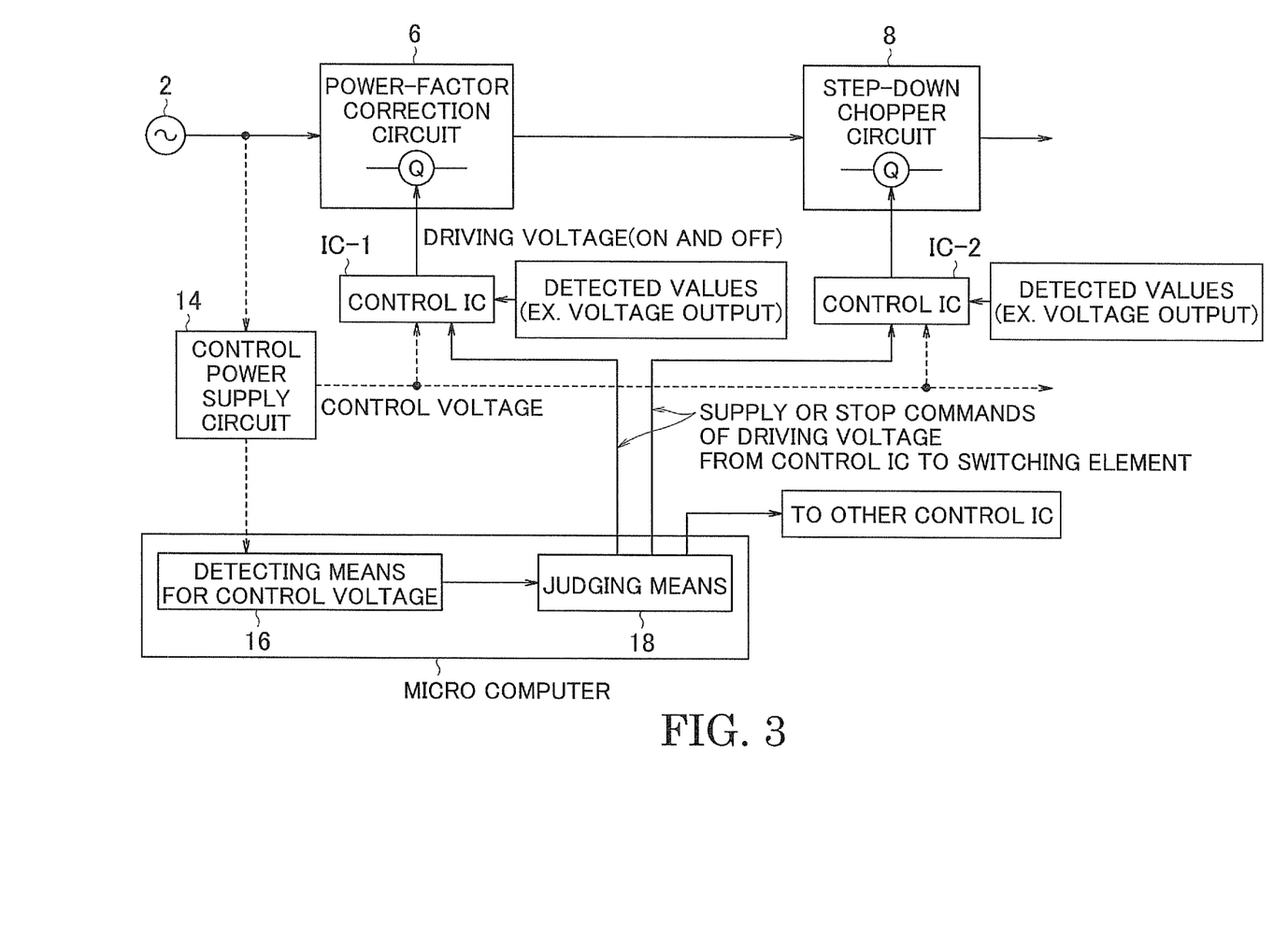
FIG. 3 is a view showing a configuration when driving circuits are control ICs.

When the control ICs are used, the on and off timing of switching elements Q is determined according to the detected values of controlled quantities (such as the current or voltage output from each of the switching circuits) of the switching circuits as shown in FIG. 3, and the switching elements Q are driven at that timing.

Figure 4:
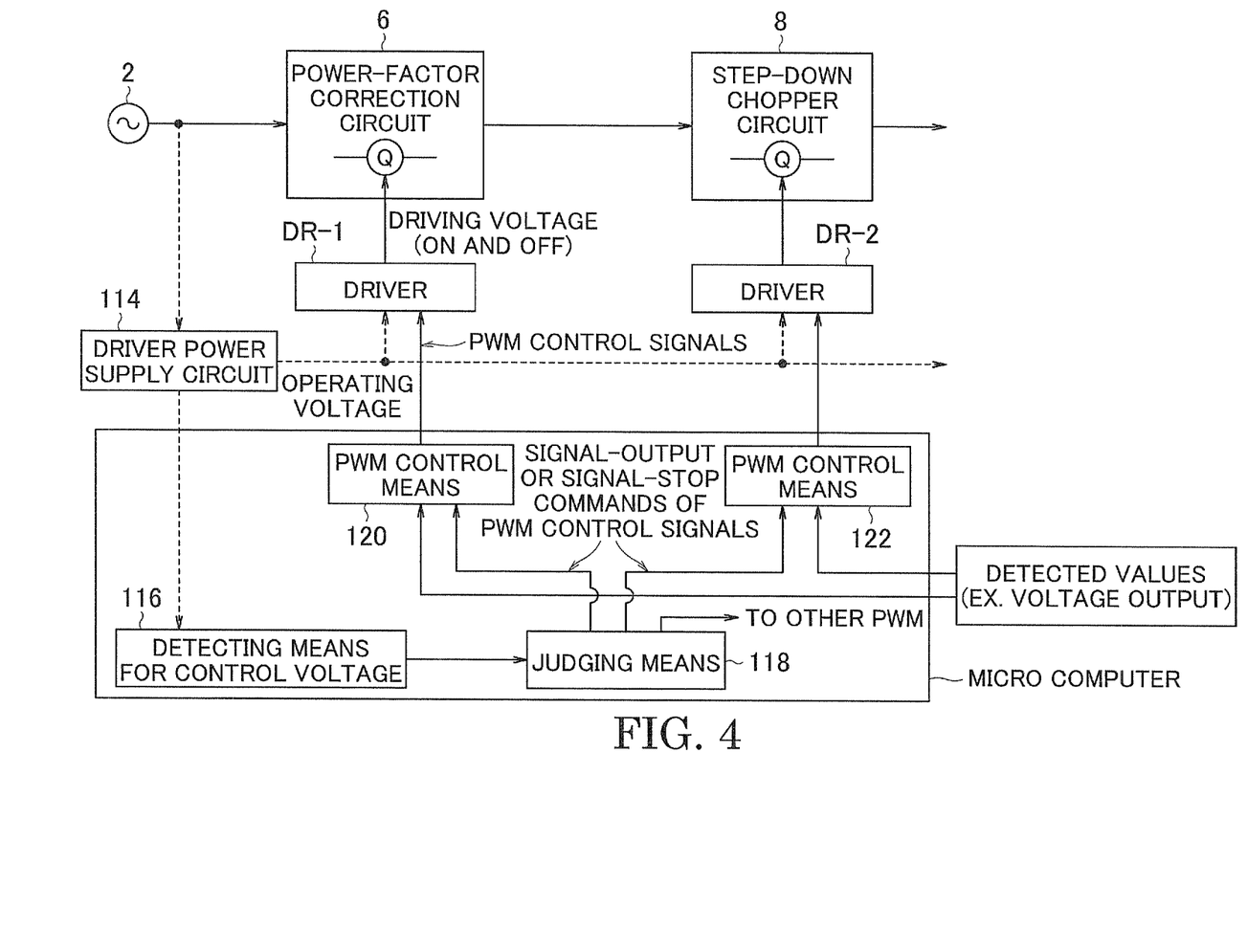
FIG. 4 is a view showing a configuration when driving circuits are driver ICs.

FIG. 4 shows the configuration of a circuit for driving switching elements Q with drivers DR-1 and DR-2. An operating voltage is supplied from a driver power supply circuit 114 to the drivers DR-1 and DR-2. The drivers use the operating voltage to output driving voltages based on PWM control signals sent from PWM control means 120 and 122 to drive the switching elements Q.

In this circuit configuration, operating-voltage detection means 116 detects the operating voltage supplied from the driver power supply circuit 114 and gives the detected value to judging means 118. The judging means 118 sends signal-output or signal-stop commands to the PWM control means 120 and 122 based on the detected value of the operating voltage. The judging means 118 compares the detected value of the operating voltage with a predetermined value; when the operating voltage is equal to or larger than the predetermined value, the judging means 118 sends output commands to the PWM control means 120 and 122; and when the operating voltage is smaller than the predetermined value, the judging means 118 sends stop commands to the PWM control means 120 and 122. The PWM control means 120 and 122 output PWM control signals to the drivers to operate the drivers while the PWM control means 120 and 122 are receiving signal-output commands. The PWM control means 120 and 122 do not output PWM control signals while the PWM control means 120 and 122 are receiving signal-stop commands, so that the drivers do not operate. Therefore, even with the drivers, the judging means 118 can control starting and stopping of the drivers in a predetermined order according to the detected value of the operating voltage.

The driving circuits of the present invention may be amplifying circuits that use transistors. For example, a microcomputer generates a driving signal for each switching element. This signal is amplified by an amplifying circuit to have a voltage required for driving the switching element and is supplied to the switching element. The switching element can be directly driven by the output of the microcomputer. In that case, the present invention can be applied to the operating voltage between the collector and the emitter of a transistor in the amplifying circuit. More specifically, when the power source is turned on, the microcomputer sends a driving signal to the transistor after the operating voltage supplied to the amplifying circuit reaches a predetermined value. When the power source is interrupted, the microcomputer stops sending the driving signal to stop the switching element during the time when the operating voltage is maintained at the predetermined value or more.

The present invention is effective not only when the alternating-current power source 2 is turned on or interrupted but also when the output of the alternating-current power source 2 fluctuates during the time when the discharge lamp is on, or when the remaining capacity of a battery provided specially for the control voltage becomes low. For example, when the control voltage becomes smaller than the predetermined value due to the fluctuation of the alternating-current power source 2, the control ICs can be stopped reliably in the same way as when the power source 2 is interrupted. When the alternating-current power source 2 recovers, and the control voltage becomes equal to or larger than the predetermined value, the control ICs can be activated reliably in the same way as when the power source 2 is turned on. Therefore, even when the alternating-current power source 2 fluctuates, starting and stopping of the control ICs are controlled appropriately. The driving circuits are prevented from starting or stopping randomly, and are also prevented from malfunctioning.

Description Of Reference Signs

2 AC power source
4 discharge lamp
6 power-factor correction circuit
8 step-down chopper circuit
10 full-bridge circuit
12 pulse generating circuit
14 control power supply circuit
16 control voltage detecting means
18 judging means
114 driver power supply circuit
116 operating voltage detecting means
118 judging means
IC-1 to IC-4 control ICs
DR-1 to DR-2 drivers

What is claimed is:

1. A lighting device comprising:
    a first switching circuit which uses the power input from the external power source to generate predetermined output power when one or more switching elements are driven,
    a first driving circuit which outputs an on-off driving voltage to the switching elements of the first switching circuit,
    a second switching circuit which uses the output power of the first switching circuit to generate predetermined output power for lighting the light source when one or more switching elements are driven,
    a second driving circuit which outputs an on-off driving voltage to the switching elements of the second switching circuit,
    a driving-voltage supply circuit which supplies a driving voltage to the driving circuits,
    a detection means which detects the driving voltage supplied from the driving-voltage supply circuit, and
    a judging means which instructs the driving circuits to start outputting the on-off driving voltages in the order from the driving circuit close to the external power source to the driving circuit close to the light source when the driving voltage detected by the detection means reaches a predetermined value during the time when the driving voltage supplied from the driving-voltage supply circuit rises.

2. The lighting device according to claim 1, including:
    three or more switching circuits that include the first and second switching circuits,
    three or more driving circuits that include the first and second driving circuits, and
    wherein the judging means instruct in a predetermined order the driving circuits to perform the output operation.

3. The lighting device according to claim 1, wherein the driving circuits are control ICs that determine the on and off timing of the switching elements according to the detected values of controlled quantities of the switching circuits and output the driving voltages at the on and off timing.

4. The lighting device according to claim 2, wherein the driving circuits are control ICs that determine the on and off timing of the switching elements according to the detected values of controlled quantities of the switching circuits and output the driving voltages at the on and off timing.

5. The lighting device according to claim 1, wherein the driving circuits are drivers that output the driving voltages at the on and off timing determined by input signals of the on and off timing.

6. The lighting device according to claim 2, wherein the driving circuits are drivers that output the driving voltages at the on and off timing determined by input signals of the on and off timing.

7. The lighting device according to claim 1, wherein the judging means instructs the driving circuits to stop outputting the on-off driving voltages in the order from the driving circuit close to the light source to the driving circuit close to the external power source before the driving voltage detected by the detection means becomes lower than the predetermined value during the time when the driving voltage supplied from the driving-voltage supply circuit falls.

8. The lighting device according to claim 7, including:
    three or more switching circuits that include the first and second switching circuits,
    three or more driving circuits that include the first and second driving circuits, and
    wherein the judging means instruct in a predetermined order the driving circuits to perform the output operation.

9. The lighting device according to claim 7, wherein the driving circuits are control ICs that determine the on and off timing of the switching elements according to the detected values of controlled quantities of the switching circuits and output the driving voltages at the on and off timing.

10. The lighting device according to claim 8, wherein the driving circuits are control ICs that determine the on and off timing of the switching elements according to the detected values of controlled quantities of the switching circuits and output the driving voltages at the on and off timing.

11. The lighting device according to claim 7, wherein the driving circuits are drivers that output the driving voltages at the on and off timing determined by input signals of the on and off timing.

12. The lighting device according to claim 8, wherein the driving circuits are drivers that output the driving voltages at the on and off timing determined by input signals of the on and off timing.

* * * * *